(12) United States Patent
Duchatelet et al.

(10) Patent No.: US 6,467,697 B2
(45) Date of Patent: Oct. 22, 2002

(54) TEMPERATURE CONTROL SYSTEM

(75) Inventors: Roland Duchatelet, Beurne; Vincent Hiligsmann, Chenee; Roger Diels, Erps-Kwerps, all of (BE)

(73) Assignee: Melexis NV, Ieper (BE)

( * ) Notice: Subject to any disclaimer, the term of this patent is extended or adjusted under 35 U.S.C. 154(b) by 0 days.

(21) Appl. No.: 09/923,579

(22) Filed: Aug. 6, 2001

(65) Prior Publication Data

US 2002/0027166 A1 Mar. 7, 2002

Related U.S. Application Data

(62) Division of application No. 09/291,658, filed on Mar. 31, 1999, now Pat. No. 6,279,832.

(51) Int. Cl.[7] ............................ H05B 1/02; H01L 43/00
(52) U.S. Cl. .................... 236/78 D; 219/502; 338/32 H
(58) Field of Search ....................... 236/78 R, 78 D; 338/32 H; 374/132; 324/232; 219/502; 330/6

(56) References Cited

U.S. PATENT DOCUMENTS

| | | | |
|---|---|---|---|
| 3,979,671 A | 9/1976 | Meeker et al. .............. 324/158 |
| 3,986,337 A | 10/1976 | Richard ............................ 62/3 |
| 4,089,184 A | 5/1978 | Beitner ............................. 62/3 |
| 4,134,344 A | 1/1979 | Jennings et al. .............. 165/30 |
| 4,172,993 A | 10/1979 | Leach ......................... 324/158 |
| 4,253,515 A | 3/1981 | Swiatosz ....................... 165/61 |
| 4,293,837 A | 10/1981 | Jaff et al. ................... 338/32.4 |
| 4,324,285 A | 4/1982 | Henderson ...................... 165/2 |
| 4,402,185 A | 9/1983 | Perchak ............................ 62/3 |
| 4,426,619 A | 1/1984 | Demand ........................ 324/73 |
| 4,584,552 A | 4/1986 | Suzuki et al. ................. 338/32 |
| 4,604,572 A | 8/1986 | Horiuchi et al. ............. 324/158 |
| 4,607,220 A | 8/1986 | Hollman ...................... 324/158 |
| 4,612,772 A | 9/1986 | Jones ................................ 62/3 |
| 4,636,726 A | 1/1987 | Santomango et al. ........ 324/158 |
| 4,727,720 A | 3/1988 | Wernicki .......................... 62/3 |
| 4,734,872 A | 3/1988 | Eager et al. .................. 364/557 |
| 4,759,190 A | 7/1988 | Trachtenberg et al. ........... 62/3 |
| 4,780,086 A | 10/1988 | Jenner et al. .................. 439/42 |
| 4,839,587 A | 6/1989 | Flatley et al. ................ 324/158 |
| 5,006,796 A | 4/1991 | Burton et al. ................ 324/158 |
| 5,028,988 A | 7/1991 | Porter et al. ................... 357/81 |
| 5,572,058 A | 11/1996 | Biard | |
| 6,118,107 A | * 9/2000 | Kobrich ....................... 219/502 |
| 6,279,832 B1 | * 8/2001 | Duchatelet et al. ......... 236/78 D |

FOREIGN PATENT DOCUMENTS

| | | | |
|---|---|---|---|
| DE | 33 25 148 A1 | 3/1984 | ....................... 33/2 |
| DE | 4135086 A1 | 4/1993 | ..................... 19/10 |
| DE | 297 16 166 U1 | 12/1997 | ......................... 5/2 |
| EP | 0 120 260 | 10/1984 | ....................... 43/6 |
| JP | 02155282 | 6/1990 | ....................... 43/8 |

* cited by examiner

*Primary Examiner*—William Wayner
(74) *Attorney, Agent, or Firm*—Townsend and Townsend and Crew LLP

(57) ABSTRACT

A temperature control system includes an integrated circuit that combines magnetic sensitive elements and infra red sensors to detect user temperature settings and measure temperature, respectively. Integration of the various sensors results in a very cost-effective and reliable temperature control system suitable for consumer applications.

8 Claims, 5 Drawing Sheets

TEMPERATURE CONTROL SYSTEM

This application is a divisional of Ser. No. 09/291,658 filed Mar. 31, 1999, now U.S. Pat. No. 6,279,832

BACKGROUND OF THE INVENTION

The present invention relates in general to temperature control systems, and in particular to a temperature control system that integrates magnetic sensitive elements and infrared sensor on a single chip for a reliable and cost effective implementation.

There are a variety of consumer goods that require a temperature control mechanism. For these types of goods, a control knob typically adjusts the target temperature within a given range as determined by the application. In an electric iron, for example, the temperature of the sole plate is controlled and adjusted to a setting determined by the characteristics of the material to be ironed. The electric iron must therefore have the capability to detect the user's requested temperature, measure and control the temperature produced by the iron.

To detect the position of a temperature control knob, existing devices typically use a potentiometer whose resistance value changes as the knob is rotated. Thus, by measuring the resistance value of the potentiometer, the device detects the setting of the control knob. While this implementation is relatively cost effective, it has the disadvantage of relying on a physical contact between the fixed resistance element and the wiping element. In an environment where the temperature is very high by the nature of the application, good reliability and accuracy is difficult to achieve at an acceptable cost. Another method for temperature control uses a bimetallic strip element in close proximity to the heated parts of the structure. Cost and reliability, however, remain difficult requirement to meet with this type of implementation as well. In the consumer market, the selling price of such products is of paramount importance, and therefore the cost of manufacturing becomes a significant factor.

There is therefore a need for a low cost and robust temperature sensing and control system that is suitable for the consumer market.

SUMMARY OF THE INVENTION

The present invention provides an integrated and cost-effective temperature sensor that can both detect the position of a control knob and measure the temperature of the controlled part. In a preferred embodiment, there is integrated onto a single piece of silicon a plurality of magnetic sensitive elements and an infrared sensor. Broadly, the magnetic sensitive elements determine the angular position of a magnetic field created by a magnet attached to the control knob. The magnet and its field rotate around the integrated circuit affecting the magnetic sensitive elements variously such that the position of the control knob can be determined. The infrared sensor in turn measures the radiation from the temperature controlled part such as to determine its temperature.

Accordingly, in one embodiment, the present invention provides an integrated circuit fabricated on a silicon substrate including a plurality of magnetic sensitive elements; position sensing circuit coupled to the plurality of magnetic sensitive elements, and configured to detect a relative position of an external magnet with respect to the plurality of magnetic sensitive elements; an infrared sensor; and a radiation sensing circuit coupled to the infrared sensor, and configured to detect an amount of radiation from an external heat source.

In another embodiment, the present invention provides a temperature control system including a temperature setting mechanism having a magnet attached thereto; and a silicon die disposed near the magnet, wherein integrated onto a first surface of the silicon die are a plurality of magnetic sensitive elements and an infrared sensor, and wherein the first surface of the silicon die faces toward a source of heat to be controlled and faces away from the magnet.

The nature and advantages of the temperature control system of the present invention will be better understood with reference to the detailed descriptions and drawings below.

DESCRIPTION OF THE SPECIFIC EMBODIMENTS

Figure 1:
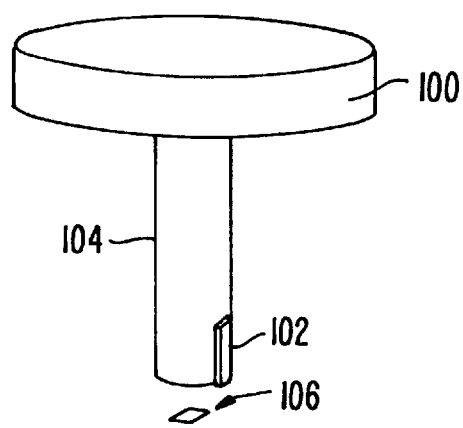
FIG. 1 shows a general arrangement of a temperature control knob, a magnet and the silicon integrated circuit according to an exemplary embodiment of the present invention.

The present invention provides in one embodiment a temperature control system that uses magnetic sensitive elements to detect the location of a heat control knob and an infrared sensor to measure the temperature. The magnetic sensitive elements as well as the infrared sensor are integrated onto a single silicon chip, along with interface and control circuitry to yield an efficient and reliable temperature control circuit. Referring to FIG. 1, there is shown a general arrangement of a temperature control knob 100, a magnet 102 and a silicon integrated circuit 106 according to an exemplary embodiment of the present invention. In the exemplary system shown, temperature control knob 100 is provided to allow the user to adjust the temperature of the device (e.g., an electric iron) to a desired setting. Magnetic element 102 is mounted on a shaft 104 integrated with control knob 100 such that it traverses an arc as a function of the setting of control knob 100. Silicon chip 106, which includes magnetic sensitive elements as well as the temperature control circuitry, is positioned under the vertical axis of shaft 104 as shown. Accordingly, the arc traverses a course around integrated circuit 106. As control knob 100 turns, the amplitude of magnetic fields surrounding integrated circuit 106 varies. Magnetic sensitive elements integrated onto integrated circuit 106 generate electrical signals in response to the amplitude of the surrounding magnetic fields. The signals generated by the magnetic sensitive elements are detected and processed by circuitry on integrated circuit 106 to determine the direction of the magnetic field and therefore the orientation of the control knob. The temperature setting is thus detected by determining the orientation of control knob 100.

The magnetic sensitive elements, an example of which is a Hall-effect magnetometer, may be laid out in different arrangements on the substrate of integrated circuit 100. Two exemplary arrangements will be described herein for illustrative purposes. In a first exemplary embodiment shown in FIG. 2, two magnetic sensitive elements (MSEs) 200-1 and 200-2 are arranged to lie on preferably orthogonal axes from the center of the traversed arc 202 of magnet 102. The same reference numerals are used herein to refer to the same elements throughout the various Figures. MSEs 200-1 and 200-2 output an analog signal whose amplitude varies with the value of the magnetic field 204. The magnetic field strength around magnet 102 decreases as the distance between an MSE 200 and magnet 102 increases. The variation in field strength 300 as a function of distance from magnet 102 is shown diagrammatically in FIG. 3. As magnet 102 traverses course 202 around integrated circuit 106, the distance between magnet 102 and MSEs 200-1 and 200-2 changes, and the value of the analog output signal of each MSE 200 changes accordingly. Thus, the analog output signal provides an accurate indication of an angle 206 (in FIG. 2) between the position of magnet 102 and the axis of MSEs 200-1 and 200-2. Where the angle of rotation of the magnet is desired to cover more than one quadrant then additional MSEs 200 can be used to determine the exact position of the control knob.

Figure 4:
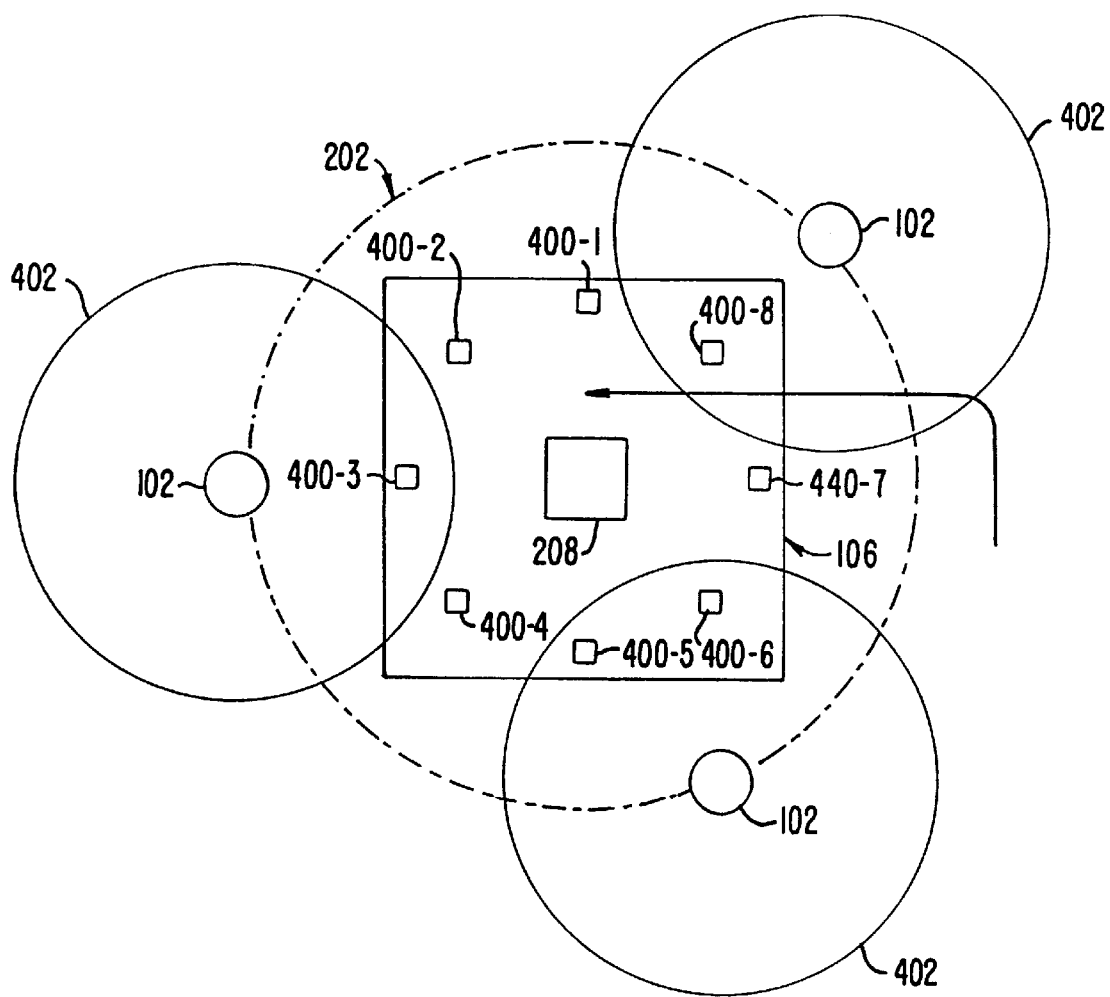
FIG. 4 shows another embodiment of the integrated circuit of the present invention having multiple magnetic sensitive elements that are evenly spaced around the center of the silicon die.

In the second arrangement, illustrated in FIG. 4, multiple MSEs 400 are arranged circularly around the center of silicon die 106. In this embodiment, MSEs 400 can be simple magnetic sensitive switches of the type that are 'ON' (i.e., conductive) when the applied magnetic field exceeds a defined threshold, and 'OFF' in all other circumstances. The position and thresholds for MSEs 400 are adjusted such that as magnet 102 traverses arc 202, magnetic field 402 causes MSEs 400 to switch into the 'ON' state and then the 'OFF' state in sequence. In a preferred embodiment, MSEs 400 are designed such that for any position of magnet 102 at least one MSE 400 is in the 'ON' state. This allows the system to establish the presence or lack of presence of a magnet. Accordingly, the position of magnet 102 is given by the one MSE 400 that is in the 'ON' state, while others are in the 'OFF' state. In one embodiment, it is possible to have two adjacent MSEs 400 be 'ON' at the same time when magnet 102 is positioned at approximately the mid point of that portion of the arc between two MSEs. This condition signals a mid-point position, allowing the position of the magnet to be determined to an accuracy nearly equivalent to that from twice as many MSEs 400.

Depending on the application, control knob 100 may be constrained to predetermined positions or its movement limited by mechanical end stops operating on the knob or shaft mechanism. Information on such movement restrictions for the temperature control knob may be taken into account electronically within the circuitry to further enhance the accuracy of the device.

Figure 5:
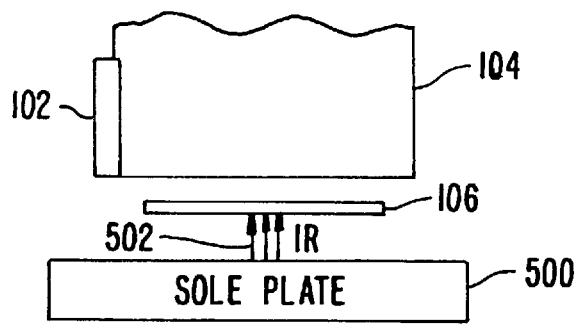
FIG. 5 depicts a side view of a temperature sensing system showing the source of heat and the infrared radiation path to the integrated circuit of the present invention.

Thus far, mechanisms for detecting a particular temperature setting as set by the position of a temperature control knob have been described. A second function performed by the temperature control system of the present invention is to measure the actual temperature of the device. To accomplish this, in addition to the magnetic sensitive elements, there is provided on the same silicon integrated circuit 106, an element 208 that senses infrared (IR) radiation (see FIGS. 2 and 4). Referring to FIG. 5, there is shown a side view of the system depicting a source of heat 500 (e.g., sole plate of an electric iron), and infrared radiation path 502 to integrated circuit silicon die 106. In a preferred embodiment, silicon die 106 is mounted with its topside, the side on which the various sensing elements are integrated, facing heat source 500. This mechanical arrangement exposes IR sensor 208 directly to heat source 500, allowing an accurate measurement of the temperature by sensing the degree of IR radiation from heat source 500. The operation of the magnetic sensitive elements is unaffected by the mechanical inversion of integrated circuit silicon die 106.

Figure 2:
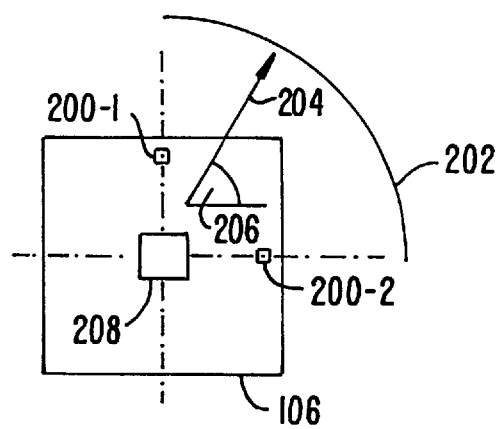
FIG. 2 shows one embodiment of the integrated circuit of the present invention having two linear analog magnetic sensitive elements.
Figure 3:
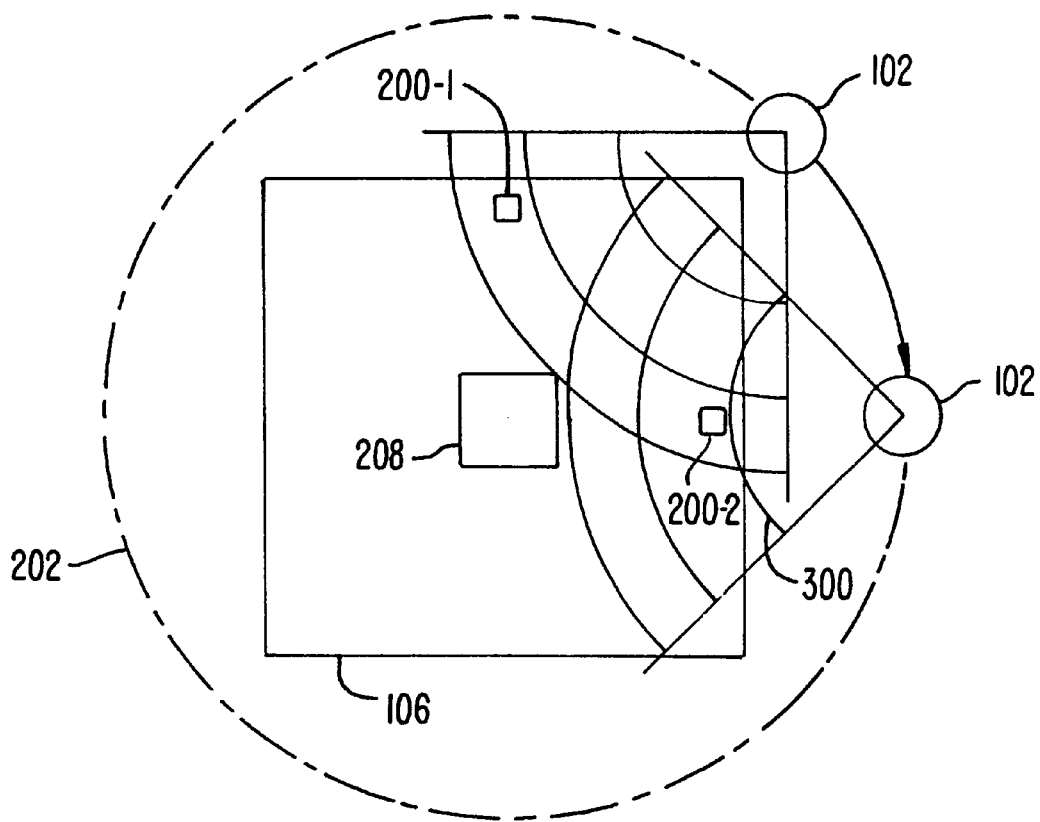
FIG. 3 shows magnetic fields created around the magnet for the embodiment of the present invention with two linear magnetic sensitive elements as shown in FIG. 2.
Figure 6:
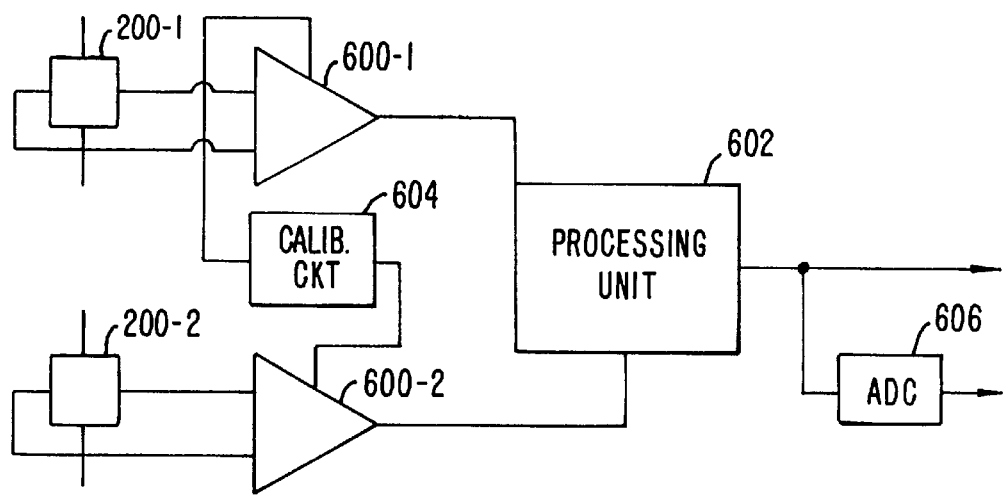
FIG. 6 is a block diagram of a temperature control circuit that interfaces with the analog magnetic sensitive elements of the type shown in FIG. 2.

The interface and control circuitry connected to the MSEs and the IR sensor will be described hereinafter. FIG. 6 is a block diagram of the circuitry for the embodiment using two (or more) analog MSEs 200 as shown in FIG. 2. MSEs 200-1 and 200-2 each have a pair of outputs connecting to a pair of inputs of amplifiers 600-1 and 600-2, respectively. In one embodiment, each MSE 200 comprises a bridge circuit implemented with Hall effect devices that produces a small differential voltage (e.g., in the millivolts range). The output signal from each MSE 200 is amplified to a desired level by amplifiers 600. It is to be understood that other embodiments for MSEs 200, such as implementations using magnetic sensitive transistors, are also possible. In such alternate embodiments, the use of an amplifier may not be necessary, or the MSE may incorporate the amplification function.

Once amplified to a desired level, the signals at the outputs of amplifiers 600-1 and 600-2 are combined in a processing unit 602. Processing unit 602 includes circuitry that compares the magnitude of the signals at the outputs of amplifiers 600-1 and 600-2 to one or more predefined threshold or reference signals, or compares them to each other, to determine the position of the knob. Thus, processing unit 602 extracts a value representing the requested temperature based on the amplifiers output signals. Processing unit 602 may include analog means wherein the signals are compared by analog circuitry to predetermined levels, or alternatively, it may perform the function digitally by converting the signals into digital form using analog to digital converters and using microprocessor means to determine the arget temperature. In those applications where the system limits the requested temperature to a number of predetermined values by mechanical or electrical means, the complexity of processing unit 602 can be reduced to differentiate between these preset values.

In a preferred embodiment, the circuit further includes a calibration or tuning circuit 604 connected to each amplifier 600-1 and 600-2. Calibration circuit 604 presets the parameters of each amplifier to accommodate manufacturing and assembly tolerances, and to compensate for variations in the magnetic field strength of the magnet. Amplifier parameters that can be adjusted for the purpose of error correction include amplifier (and sensor) offset, amplifier gain and temperature non-linearities. These parameters can be fine tuned by, for example, programmably inserting well-controlled currents into the amplifier at the relevant nodes of the amplifiers. In one embodiment, calibration circuit 604 includes user programmable storage elements, such as non-volatile memory cells, for storing the control information for the preset parameters. In applications where a digital output signal is required, the output of processing unit 602 can be fed into an analog to digital converter ADC 606. Alternatively, outputs of amplifiers 600-1 and 600-2 may be digitized by one or more analog to digital converters before being processed by digital processing unit 602.

Figure 7:
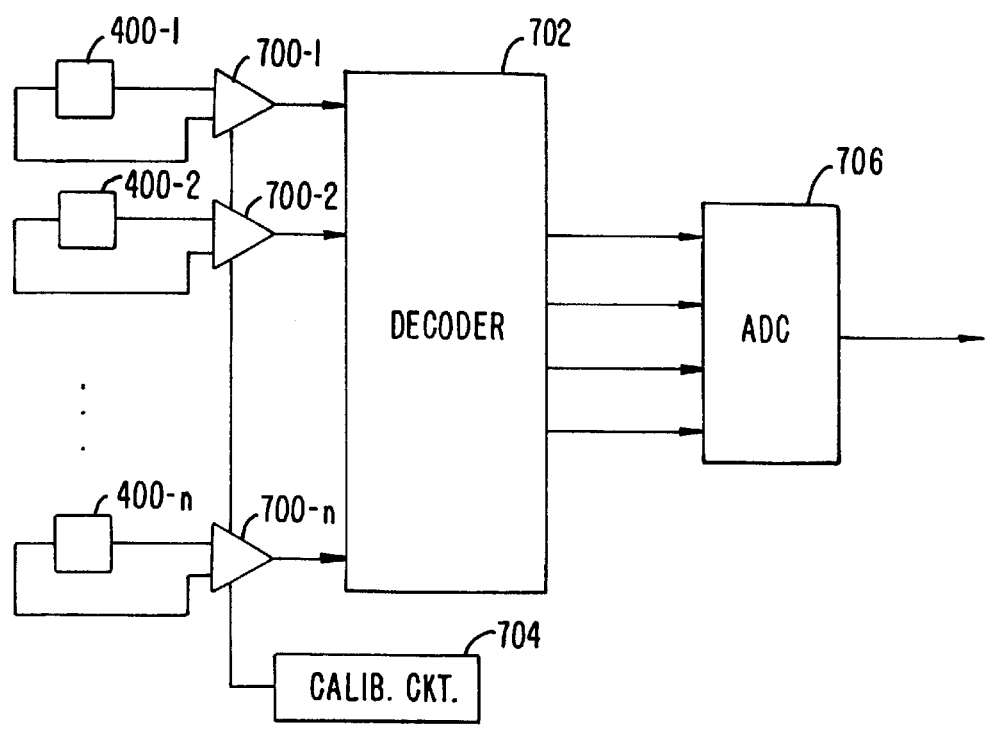
FIG. 7 is a block diagram of a temperature control circuit that interfaces with the switching magnetic sensitive elements of the type shown in FIG. 4.

FIG. 7 is a block diagram of the circuitry for use with the embodiment having multiple MSEs in switching mode as shown in FIG. 4. MSEs 400 are each connected via an amplifier 700 to a decoder 702. Based on the 'ON' or 'OFF' state of one (or more) of MSEs 400, decoder 702 determines a value representative of the requested temperature. Calibration circuitry 704 and data converter 706 may be combined with the circuit for similar purposes as discussed above in connection with the block diagram of FIG. 6.

Figure 8:
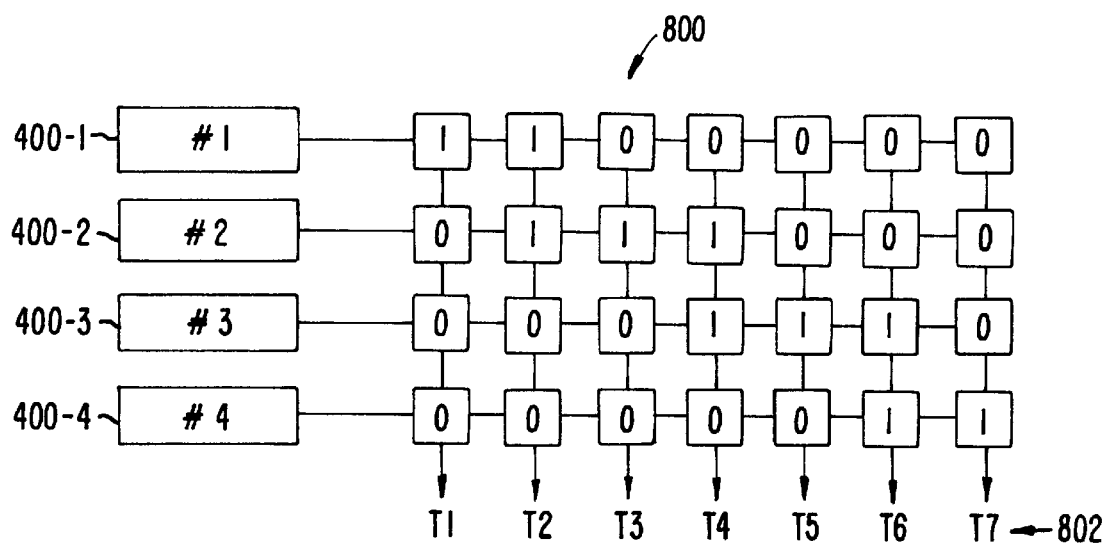
FIG. 8 shows an exemplary decoding scheme for a temperature control system using four magnetic sensitive elements according to one embodiment of the present invention.

FIG. 8 shows an example for a decoding technique for a system with four MSEs 400. As shown in FIG. 8, a table 800 defines the conditions for selecting any of seven possible temperature settings 802. Assigning binary values "1" and "0" respectively to the 'ON' and 'OFF' state of each MSE 400 allows for a straightforward decoding of the state of the four MSEs. Note that a binary value is assigned to each of the seven temperature settings T1 through T7 such that a maximum of two adjacent MSEs would be 'ON' at any given time. Therefore, when the temperature control knob is positioned such that only MSE 400-1 turns 'ON', a temperature setting of T1 is detected, and when positioned such that both MSEs 400-2 and 400-3 turn 'ON', a temperature setting of T4 is detected, and so on. Such table-based decoding can be readily implemented as transistor arrays.

Figure 9:
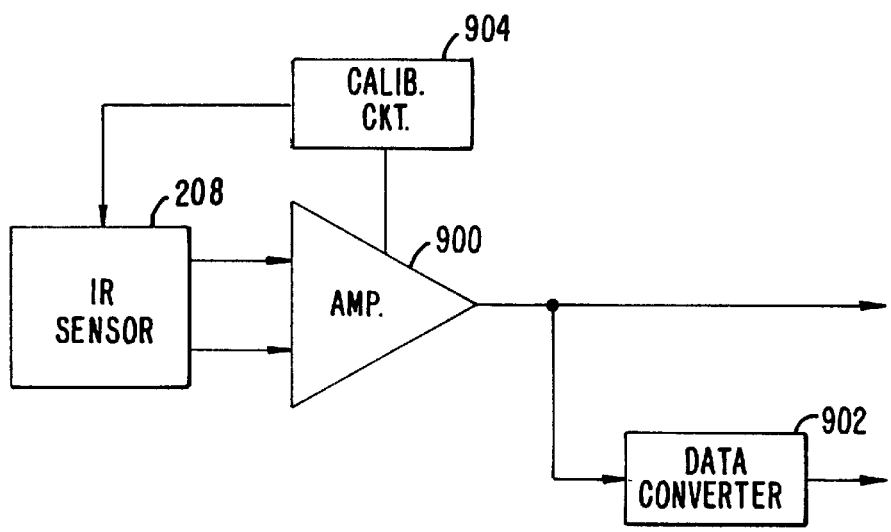
FIG. 9 is a block diagram of a temperature control circuit that interfaces with an infrared sensor according to an exemplary embodiment of the present invention.

Referring now to FIG. 9, there is shown a block diagram of the interface and control circuitry for the infrared sensor. An amplifier 900 receives the signal generated from IR sensor 208. Typical IR sensors have an isolated area covered by heat absorbing material and with embedded thermopiles. The thermopiles respond to the increase in temperature by generating a small voltage. Connecting many in series will generate a signal of few millivolts that represents the temperature of the object. Amplifier 900 conditions the IR sensor output signal and generates an output signal suitable for further processing by the rest of the circuit. Similar to the circuitry for the magnetometers, an optional data converter 902 may be used to generate the signal in the form desired (analog or digital). Also, an optional calibration circuit 904 can be connected to amplifier 900 to programmably vary the parameters of the amplifiers to compensate for variations in the radiation parameters of heat source and the sensitivity of the infrared detector.

Thus, the circuit of the present invention provides accurate information on the desired temperature as set by the user and the actual temperature of the device. These two pieces of information are then processed to arrive at the appropriate control signal to adjust the heat source or heating element). The control circuitry that controls the heating element based on the detected requested temperature and the measured temperature, is well known and therefore not described herein. Such control circuitry can be implemented on the same integrated circuit silicon die (106). In a preferred embodiment, well known protection mechanisms can also be added to assess the state of the signals from the sensors and determine if faults have occurred. Such assessment can be used in the event of faulty signals to override the control circuitry in order to limit the temperature of the heat source and reduce the risk of damage and danger.

In conclusion, the present invention provides a temperature control system wherein both the sensing of the position of temperature control knob and the sensing of the temperature of the heated part are implemented on a single silicon die. It provides a cost-effective solution to the temperature control requirements of a variety of consumer goods. While the above is a complete description of the preferred embodiment of the present invention, it is possible to use various alternatives, modifications and equivalents. For example, the number and positions of magnetic sensitive elements can vary depending on the application without departing from the spirit of this invention. Therefore, the scope of the present invention should be determined not with reference to the above description but should, instead, be determined with reference to the appended claims, along with their full scope of equivalents.

What we claim is:

1. A temperature control system comprising:
    a temperature setting mechanism having a magnet attached thereto;
    a source of heat that is to be controlled to a target temperature determined by said temperature setting mechanism; and
    a silicon die disposed between said temperature setting mechanism and said source of heat,
        wherein, integrated onto a first surface of said silicon die are a plurality of magnetic sensitive elements and an infrared sensor, and
        wherein, said first surface of said silicon die faces toward said source of heat and faces away from said magnet.

2. The temperature control system of claim 1 wherein said plurality of magnetic sensitive elements comprises a plurality of Hall-effect magnetometers.

3. The temperature control system of claim 1 wherein said plurality of magnetic sensitive elements comprises a plurality of magnetic sensitive switches.

4. The temperature control system of claim 1 wherein said temperature setting mechanism comprises a control knob mounted on a cylindrical shaft, and wherein said magnet attaches to said cylindrical shaft such that said magnet traverses an arc as a function of the setting of said control knob.

5. The temperature control system of claim 4 wherein said silicon die is positioned substantially under the vertical axis of said shaft where by said arc traverses a course around said silicon die.

6. A method for controlling a temperature of a device, comprising the steps of:
    fabricating a plurality of magnetic sensitive elements on a surface of a silicon die;
    disposing said silicon die near a temperature setting mechanism having a magnet attached thereto, such that movement of said temperature setting mechanism causes variations in magnetic fields surrounding said silicon die;
    detecting output signals of said plurality of magnetic sensitive elements that are generated in response to said variations in magnetic fields; and
    arriving at a target temperature by determining a position of said temperature setting mechanism based on said output signals.

7. The method of claim 6 further comprising the steps of:
    measuring an actual temperature of the device using infrared sensors fabricated on said silicon die; and
    controlling a temperature of a heat source in the device in response to said measured actual temperature and said target temperature.

8. The method of claim 7 wherein said step of disposing disposes said silicon die between said temperature setting mechanism and said heat source with a top surface of said silicon die facing said heat source.

* * * * *